UNITED STATES PATENT OFFICE.

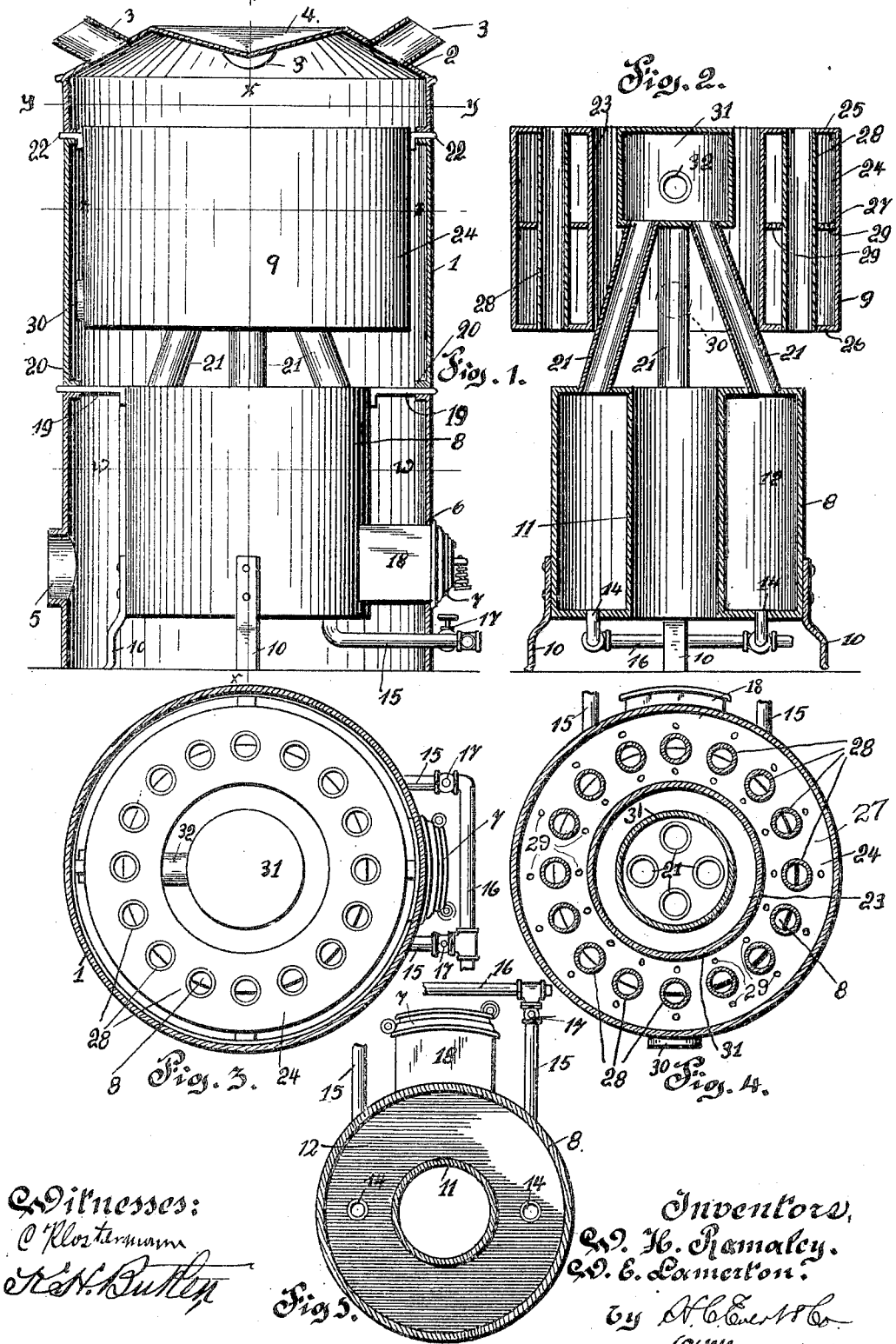

WILLIAM H. RAMALEY AND WILLIAM E. LAMERTON, OF PITTSBURG, PENNSYLVANIA.

HEATER.

No. 811,325.  Specification of Letters Patent.  Patented Jan. 30, 1906.

Application filed April 8, 1905. Serial No. 254,507.

*To all whom it may concern:*

Be it known that we, WILLIAM H. RAMALEY and WILLIAM E. LAMERTON, citizens of the United States of America, residing at Pittsburg, in the county of Allegheny and State of Pennsylvania, have invented certain new and useful Improvements in Heaters, of which the following is a specification, reference being had therein to the accompanying drawings.

This invention relates to certain new and useful improvements in heaters, and more particularly to that type of heater wherein gas is used as a fuel for heating cold air taken into the heater.

Our invention aims to provide a heater of the above-described character and having a large area of heating-surface whereby the cold air taken into the heater can be quickly and effectually heated to a desired temperature. To this end we have provided a novel form of casing in which a circuitous path is provided for the passage of the products of combustion whereby the full benefit and heating power can be derived therefrom prior to the escape of said products from the heater. In this connection we have devised novel means for baffling the products of combustion during their passage through the heater and novel means for conveying the cold air entering the heater through the casing containing the products of combustion.

The invention consists in the novel construction, combination, and arrangement of parts, which will be hereinafter more fully described, and then specifically pointed out in the claims, and, referring to the drawings accompanying this application, like numerals of reference designate corresponding parts throughout the several views, in which—

Figure 1 is a side elevation of our improved heater, the outer casing thereof being shown in vertical section. Fig. 2 is a vertical sectional view of our improved heater, taken on the line $x\,x$ of Fig. 1. Fig. 3 is a transverse sectional view taken on the line $y\,y$ of Fig. 1. Fig. 4 is a transverse sectional view taken on the line $z\,z$ of Fig. 1, and Fig. 5 is a similar view taken on the line $w\,w$ of Fig. 1.

To put our invention into practice, we employ an annular shell or casing 1, having a substantially frustrated cone-shaped top 2. The top is provided with a plurality of flues 3, adapted to convey the heated air from said heater to the compartments to be heated. The top 2 is provided with a concavity 4, serving functionally as a deflector to baffle the heated air and deflect it into the flues 3. Adjacent to the bottom of the shell 1 we provide a cold-air inlet 5, and diametrically opposite this inlet we provide an opening 6, in which a door 7 is fitted, whereby access may be had to the interior of the shell.

Mounted within the shell 1 is a burner-casing 8 and a heating-casing 9, the burner-casing being annular in form and supported by suitable legs 10. The burner-casing is provided with a central cylinder 11, forming a circular combustion-chamber 12. In the bottom of the combustion-chamber are mounted burners 14 14, which are connected to feed-pipes 15 15, that extend outside of the casing and are connected to a main supply-pipe 16. The pipes 15 15 are provided with suitable valves 17 for controlling the supply of gas to be fed to the burner. The burner-casing communicates with the opening 6 of the shell 1 by a casing 18, and the burners are adapted to be ignited from without the casing through the medium of the door 7 and the casing 18. The burner-casing is braced within the shell 1 by a plurality of inwardly-extending rods 19, mounted in bosses 20, carried by the inner walls of the shell 1.

The heating-casing is supported partially by a plurality of angularly-disposed flues 21, passing upwardly from the top of the burner-casing, and also by a plurality of rods 22, extending inwardly from the inner walls of the casing 1 to support and brace the heating-chamber.

The heating-chamber is preferably annular in cross-section and is formed with a central cylinder 23, which forms a circular heating-compartment 24. The heating-compartment is provided with a top 25, a bottom 26, and a central horizontal partition 27. Circularly arranged in the heating-compartment 24 and vertically disposed therein are a plurality of flues 28, extending from the bottom 26 of the heating-compartment to the top thereof. The horizontal partition 27 is provided with apertures 29 29, whereby the contents of the heating-compartment above the partition can pass to the opposite side of the partition. The heating-chamber 9 is provided with an exhaust-flue 30 to carry the products of combustion outside of said heater after the full benefit has been derived from said products.

Centrally supported within the cylinder 23 of the heating-chamber is an annular casing 31, with which the combustion-chamber 12 communicates by means of the flues 21. The casing 31 communicates with the heating-compartment 24 by a pipe 32.

When our improved heater is in operation, the products of combustion pass from the combustion-chamber 12 upwardly through the flues 21 to the casing 31, through the pipe 32 to the upper part of the heating-compartment 24, passing around said compartment and downwardly through the apertures 29 29 to the lower part of the compartment, passing around this compartment and out through the exhaust-flue 30. The cold air entering the air-inlet 5 encounters the burner-casing and may either pass around this casing or upwardly through the cylinder 11 of said casing, around the flues 21 and the heating-chamber, and passing upwardly through the flues 28 to the top of the shell 1, from where the air which has become heated by contact with the heated surfaces of the casings passes out through the flues 3 to the compartments to be heated.

It will be apparent from the foregoing description, taken in connection with the drawings, that we have provided a novel form of heater for heating cold air, and while we have not illustrated any means for controlling the air-inlet in connection with the furnace it is obvious that the ordinary type of damper may be used for this purpose.

The construction which we have embodied in our improved heater can readily be employed in connection with gas-stoves, furnaces, and the like apparatus, and we may employ other fuel than gas for operating our improved furnace.

It will be noted that various changes may be made in the details of construction without departing from the general spirit and scope of the invention.

What we claim, and desire to secure by Letters Patent, is—

1. In a heater of the type described, the combination with a shell having an air-inlet, a plurality of flues carried by said shell, a burner-casing mounted within said shell, a heating-casing supported within said shell, angularly-disposed flues establishing communication between said casings, said heating-casing having a circular heating-compartment formed therein, a perforated partition horizontally mounted within said compartment, vertically-disposed flues passing through said compartment and said partition, and an exhaust-flue communicating with said heating-casing, substantially as described.

2. In a heater of the type described, the combination with a shell having an air-inlet, a plurality of flues carried by said shell and a burner-casing mounted within said shell, said burner-casing being of annular form, and burners extending into said burner-casing, of a heating-casing arranged in said shell above the burner-casing, said heating-casing being of annular form, a horizontal perforated partition arranged in said heating-casing, and said heating-casing being provided with a plurality of flues extending from the bottom thereof through said partition to the top thereof.

In testimony whereof we affix our signatures in the presence of two witnesses.

WILLIAM H. RAMALEY.
WILLIAM E. LAMERTON.

Witnesses:
   JAS. J. BOYCE,
   G. J. ANDERSON.